Feb. 6, 1934.    J. SNEED    1,945,622
CROSS SHAFT
Filed July 11, 1929    2 Sheets-Sheet 1
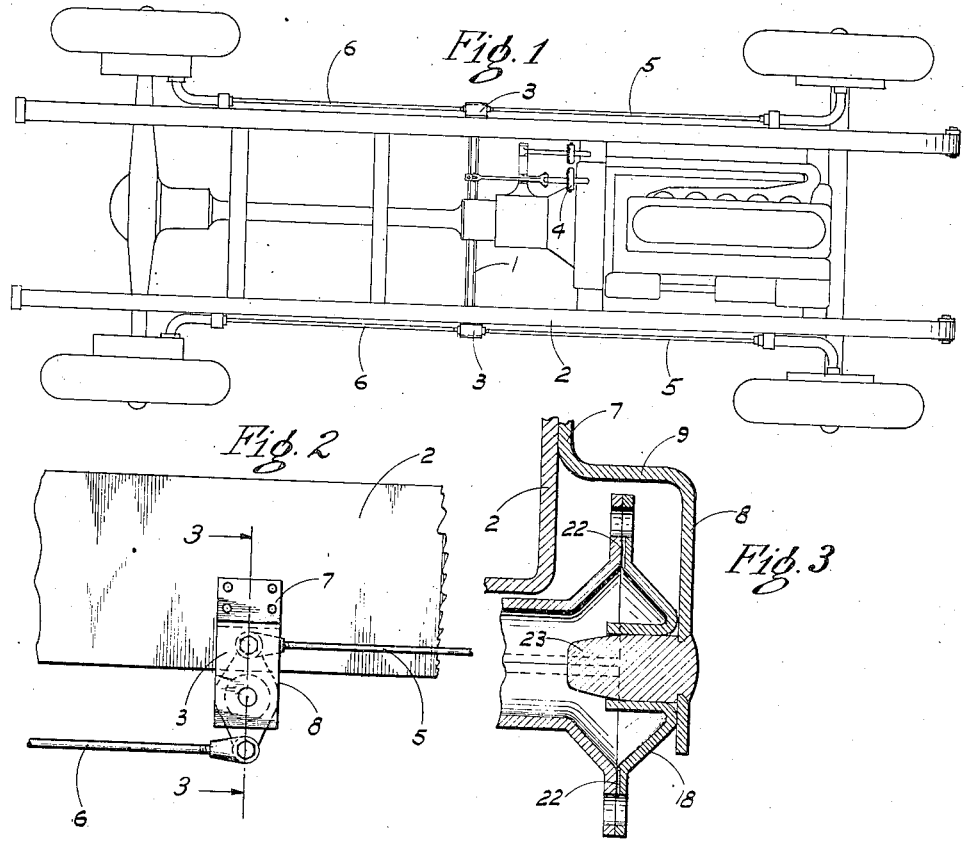
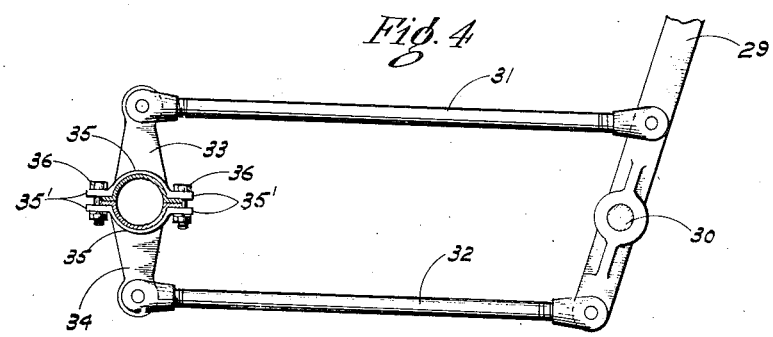
Inventor
JOHN SNEED.
By Richey & Watts
Attorney

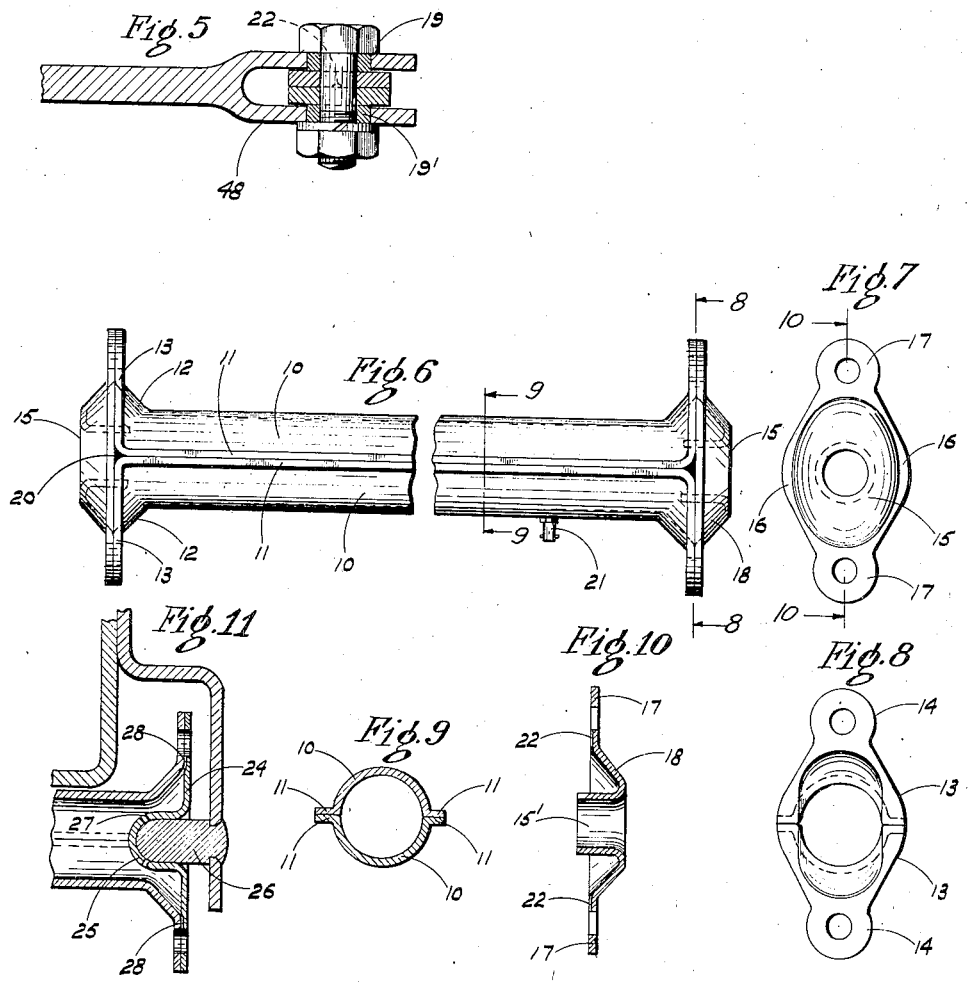

Patented Feb. 6, 1934

1,945,622

UNITED STATES PATENT OFFICE 1,945,622

CROSS SHAFT

John Sneed, Ferndale, Mich., assignor to The Midland Steel Products Company, Cleveland, Ohio, a corporation of Ohio, as trustee for Steeldraulic Brake Corporation, Detroit, Mich., a corporation of Michigan Application July 11, 1929. Serial No. 377,417

14 Claims. (Cl. 64—29)

This invention relates to brake linkage and more particularly to cross shaft construction and arrangement in such a linkage.

In the usual type of automobile brakes the braking effort is transmitted from a foot pedal or a hand lever through suitable links to a cross shaft which extends transversely of the vehicle frame and which has brake operating rods or cables attached at its ends, extending to the front and rear wheel brakes. This cross shaft may be rotatably mounted on bearings supported by the frame. When the shaft is rotated by the movement of the pedal or hand lever, the brakes are applied through the above mentioned rods or cables, all of which parts constitute the linkage or hook-up.

It is among the objects of my invention to provide a brake cross shaft which will have adequate torsional stiffness and which will be adapted to be readily supported by suitable bearings. Other objects of my invention include the provision of a built-up shaft with end portions having integrally formed bearing surfaces; the provision of a built-up shaft which may be made of pressed metal sections and which has integrally formed lever arm portions at its ends; the provision of a built-up hollow brake operating shaft having longitudinally extending flange portions and a pair of oppositely extending levers clamped to said flange portion on opposite sides thereof for supporting and stiffening the shaft.

Further objects of my invention include the provision of a hollow brake operating cross shaft which may be charged with lubricant for the end bearings and to the brake rod bearings thus obviating the necessity of frequent lubrication of these parts and allowing them all to be lubricated by lubricant forced into the shaft at one point instead of at the individual bearings; the provision of a hollow built up brake operating cross shaft which may be easily and cheaply made from pressed metal sections in which only two different sets of dies are required to form all the parts required for a complete shaft with rod engaging arms.

These and other objects of my invention will appear from the following description of a preferred form of my invention, reference being had to the accompanying drawings. The essential characteristics are summarized in the claims.

In the drawings, Fig. 1 is a diagrammatic plan view of a motor vehicle chassis illustrating the brake hook-up or linkage; Fig. 2 is a fragmentary side elevation of a vehicle frame with cross shaft and brake rods in position; Fig. 3 is an enlarged vertical cross section taken on the line 3—3 of Fig. 2; Fig. 4 is a side elevation showing a type of linkage for connecting the cross shaft to the operating pedal or lever; Fig. 5 is a plan section showing a form of pivoted connection between a brake rod and one of the end arms of the cross shaft; Fig. 6 is a detached side elevation of my cross shaft; Fig. 7 is an end elevation of my cross shaft; Fig. 8 is an end elevation taken on the line 8—8 of Fig. 6 and showing the end of the cross shaft with the end bearing part removed; Fig. 9 is a cross section taken on the line 9—9 of Fig. 6; Fig. 10 is a cross section through the end bearing part only taken on the line 10—10 of Fig. 7; and, Fig. 11 is a view similar to Fig. 3 showing a modified form of end bearing part.

The brake cross shaft 1, as shown in Fig. 1, extends transversely of the vehicle frame 2 and is supported by the bearing brackets 3 which are secured to the side rails of the frame. The brake operating pedal 4 is preferably connected to the cross shaft 1 through suitable linkage such as shown in Fig. 4 and which will be more fully described and claimed in my copending application Serial No. 218,874, filed September 12, 1927. Forwardly extending brake rods 5 and the rearwardly extending brake rods 6 are attached to oppositely extending arms on the ends of the cross shaft, whereby rotational movement imparted to the cross shaft 1 by movement of the foot pedal 4 will move rods 5 and 6 longitudinally. This longitudinal movement may be adapted to actuate brakes of any suitable type on the front and rear wheels of the vehicle in well known manner.

I prefer to suspend the cross shaft 1 below the frame 2 of the vehicle as shown in Figs. 2 and 3. This obviates the necessity of punching holes in the side rails. The supporting brackets 3 may be riveted or bolted to the outside of the frame 2 as shown. A satisfactory bracket may be made by bending a piece of metal of proper thickness to have an attaching flange 7, a downwardly extending offset bearing supporting portion 8 and a connection portion 9.

As best shown in Figs. 6, 7, 8, 9 and 10, my cross shaft is built up from separate parts, all of which are well adapted to be pressed or drawn from sheet or strip stock. The longitudinal body portion of the shaft is made up of a pair of identical semi-tubular sections 10 having longitudinally and outwardly extending flanges 11 and flared out end portions 12. The end portions also have flanges 13 disposed at right angles to the flanges 11 and preferably lie in a plane normal to the axis of the shaft. This is clearly shown in Fig. 8 which also shows how the brake rod operating levers 14 comprise integral extensions of the end flanges 13.

In building up a shaft, a pair of semi-cylindrical sections 10 are placed with their longitudinal flanges 11 lying together and with their end flanges 13 in alignment. Means for maintaining these parts in position will be later described.

To cover the ends of the shaft and provide bearings for rotatably supporting it, I prefer to form the end pieces 15, see Fig. 10, with inwardly drawn bearing portions 15'. Figs. 7 and 10 illustrate these end pieces, the outside contour of which corresponds to the outside contour of the flanges 13 and levers 14 at the end of the longitudinal tubular portion of the assembled shaft. Flanges 16 of the pieces or parts 15 are adapted to butt against the end flanges 13 and have portions 17 which correspond to the lever arms 14 on the longitudinal members.

In assembling the shaft the end pieces 15 are preferably welded to the tubular flanged ends of the body of the shaft formed by the semi-cylindrical sections 10. The central part of the end pieces 15 is dished outwardly forming an outwardly extending boss 18. When the shaft is assembled and in use this boss 18 serves to maintain the brake rod operating levers 14 in spaced relation from the side rails and the bearing brackets 3. This is advantageous in the type of construction shown in Fig. 3 in order to provide clearance for the yoke 48 and bolt 19 (see Fig. 5) by which the brake rods are attached to the levers 14 and end parts 15.

It will be evident from the above description that my shaft is built up from four separate parts, namely, a pair of identical longitudinal members 10 and a pair of identical end pieces 15. These parts are so shaped that they can readily be stamped or drawn from sheet stock and, as there are only two different forms used, only two sets of dies will be required. In assembling the parts to form a complete shaft as shown in Fig. 6, I prefer to place them in suitable jigs to temporarily hold them in their proper relative positions and then weld the parts together by any suitable welding means.

Between the ends of the abutting longitudinal flanges 11 and the flanges 16 of the end pieces there will be substantially triangular openings 20 and I prefer to fill these in with metal deposited by means of the electric arc or gas flame in well known manner.

By welding the abutting flanges together I obtain a very strong and sturdy construction and also form a fluid tight tubular shaft. This is particularly advantageous as, by providing a single lubricant connection 21, grease can be forced into the hollow body of the shaft. This grease will continuously lubricate the end bearings, which in the preferred form are open on their inner ends, as shown in Fig. 3. To provide for the lubrication of the brake rod bearing grooves 22 may be formed in the end plates 15. These grooves extend from the inside of the shaft to the bearings and allow grease which is forced into the shaft through the lubricant connection 21 to lubricate the brake rod bearings.

Referring particularly to Figs. 3 and 5, it will be seen that regardless of whatever welding is done, the parts of the shaft are rigidly assembled and held together by the rod bearing bolt 19, which with suitable bearing shims 19' firmly clamp the end pieces to the separate halves of the shaft and hold the whole assembly together. The rigidity of the assembly is further strengthened by lever arms 33 and 34, (see Fig. 4) which clamp between them the mid-portion of the body of the shaft.

Bearings or trunnions 23 may be supported in the downwardly extending portions 8 of the bearing brackets 3 by riveting over the end of the trunnion 23 as shown in Fig. 3. The bearing brackets 3 are so formed that, when they are in position on the vehicle frame and the cross shaft is mounted on the trunnions 23, the downwardly extending portions 8 are sprung apart by the cross shaft and exert pressure on the ends of the shaft. This prevents any movement of the shaft in a direction transverse of the frame and aids in keeping dust, etc. out of the shaft bearings.

Fig. 11 shows a modified form of end piece 24 having an inwardly extending cup like bearing portion 25. The bearing trunnion 26 is shaped to fit the inner surface of the cup like bearing 25. Lubricating holes 27 may be provided in the cup like bearing 25 to allow grease from the inside of the shaft to lubricate the end bearings and grooves 28, similar to grooves 22, may be formed in the end piece 24 to lubricate the brake rod bearings.

Fig. 4 illustrates a form of linkage by virtue of which only torsional loads will be applied to the cross shaft 1. The pedal arm or hand lever 29 is mounted on the shaft 30 and has links 31 and 32 pivoted to it equidistant from shaft 30. These links extend rearwardly and are attached to the ends of the oppositely extending levers 33 and 34. These levers 33 and 34 have inner hub portions 35 and flanges 35' which are adapted to fit the cross shaft 1 and may be clamped to the cross shaft and to each other by the bolts 36 which extend through the flanges 35'. The flanges 11 of the cross shaft 1 aid in preventing any relative movement between the lever arms 33 and 34 and the cross shaft.

When the top of the pedal arm 29 is moved forward (to the right in Fig. 4) the link 31 will be in tension and will pull the lever 33 forward. This pull will be balanced by an equal and opposite force exerted on the lever 34 which will be in compression. Thus the forces tending to bend the cross shaft 1 will be balanced.

If desired gaskets may be inserted between the abutting flanges of the parts making up my built-up shaft and, instead of welding the seams, suitable clamps may be used to hold the parts together. Other modifications of my invention will be evident to those skilled in the art and I do not limit myself to the specific forms herein shown and described except as defined in the appended claims.

I claim:—

1. A built up brake operating cross shaft comprising a pair of semi-tubular members having longitudinally extending flanged edge portions and flared out ends having outwardly extending flange portions lying in a plane at right angles to the plane of said first named flanged portions, means for holding said semi-tubular members in abutting relation with their longitudinally extending flanged portions adjacent and their corresponding end flanges lying in the same plane, a pair of end bearing supporting members having integrally formed bearing portions and means for maintaining said end members in abutting relation to said end flanges with the axes of said integrally formed bearing portions lying along the common longitudinal axis of said semi-tubular members.

2. A built up brake operating cross shaft comprising a pair of semi-tubular members having longitudinally extending flanged edge portions and flared out ends having outwardly extending flange portions lying in a plane at right angles to the plane of said first named flanged portions, means for holding said semi-tubular members in abutting relation with their longitudinally extending flanged portions adjacent and their corresponding end flanges lying in the same plane, a pair of end bearing supporting members having integrally formed inwardly extending internal bearing portions and means for maintaining said end members in abutting relation to said end flanges with the axes of said integrally formed bearing portions lying along the common longitudinal axis of said semi-tubular members.

3. The combination of a built up hollow brake operating cross shaft comprising longitudinally separable parts and having internal bearing portions at its ends, bearing portions coacting with said internal bearing portions and supported on the opposite sides of a vehicle frame and a pair of oppositely extending levers secured to each other and laterally engaging and securing the said separable parts of said shaft.

4. The combination of a hollow brake operating cross-shaft having flared end portions, bearing supporting members secured to said flared end portions having bearing portions supported thereby, said bearing portions extending inwardly toward and being disposed in coaxial relation to said hollow shaft.

5. The combination of a hollow built up brake-operating cross shaft having longitudinally extending external flange portions and bearing portions secured to its ends and extending inwardly therefrom, means for applying a torsional load to said shaft at a point remote from its ends and means for securing said first named means to said longitudinally extending flanges.

6. The combination of a hollow built-up brake operating cross-shaft having longitudinally extending external flange portions, a pair of oppositely extending levers each having a hub portion and means for securing said hub portions together with said flange portions clamped between their adjacent surfaces.

7. A brake operating cross shaft comprising a pair of semi-tubular members disposed in abutting relation to form a tubular shaft, bearing supporting members attached to said shaft at its ends and levers extending outwardly from said shaft at its ends.

8. A built up shaft comprising a pair of longitudinally extending members having outwardly extending flanges at their ends formed integrally with said members and constituting lever arms.

9. A built up shaft comprising longitudinally extending members having longitudinally extending flanges constituting keys and having lateral flanges constituting lever arms.

10. A built up shaft comprising a pair of longitudinally extending members each having at least at one end an outwardly extending flange lying in a plane normal to the axis of the shaft and constituting a lever therefor.

11. A built up shaft comprising a pair of longitudinally extending members having lateral flanges oppositely extending at their ends and constituting lever arms in combination with bearing plates shaped to conform to said flanges and disposed closely adjacent thereto.

12. A built up brake operating cross shaft having two semi tubular longitudinally extending members with longitudinal flanges engaging each other and constituting keys with laterally extending flanges at the ends constituting lever arms lying in a plane normal to the axis of said shaft, and end bearing plates lying adjacent last named flange and secured to the ends of said shaft.

13. A hollow built up shaft comprising a plurality of separate longitudinal members, and a member normal to the shaft and attached to corresponding ends of the longitudinal members for securing the latter together to form said shaft.

14. A hollow built up shaft comprising a plurality of separate longitudinal members having integral lateral flanges at corresponding ends extending normal to the axis of the shaft, and a member normal to the shaft and attached to said flanges of the longitudinal members for securing the latter together to form said shaft.

JOHN SNEED.